Dec. 10, 1968  TAKAO WAKABAYASHI  3,415,356
STORAGE AND FEEDING APPARATUS
Filed May 24, 1967  7 Sheets-Sheet 5
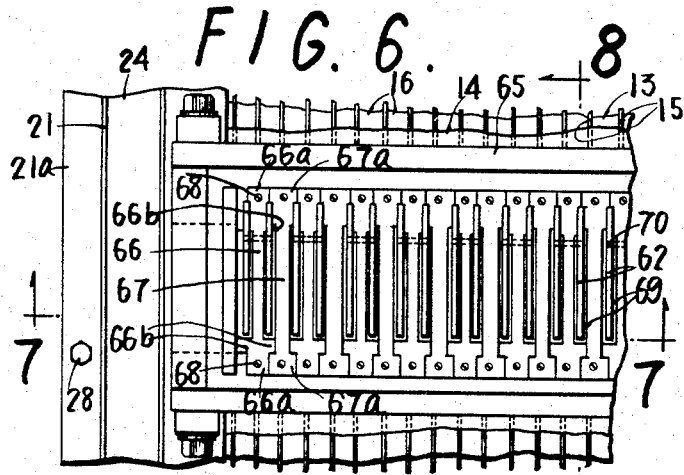
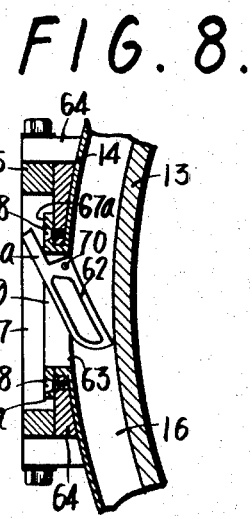
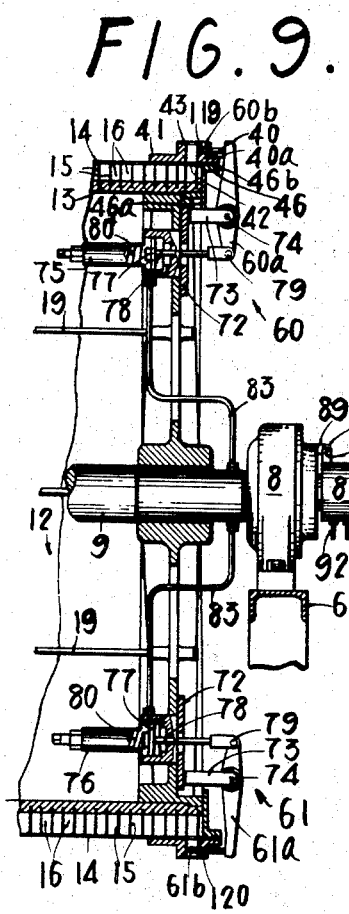
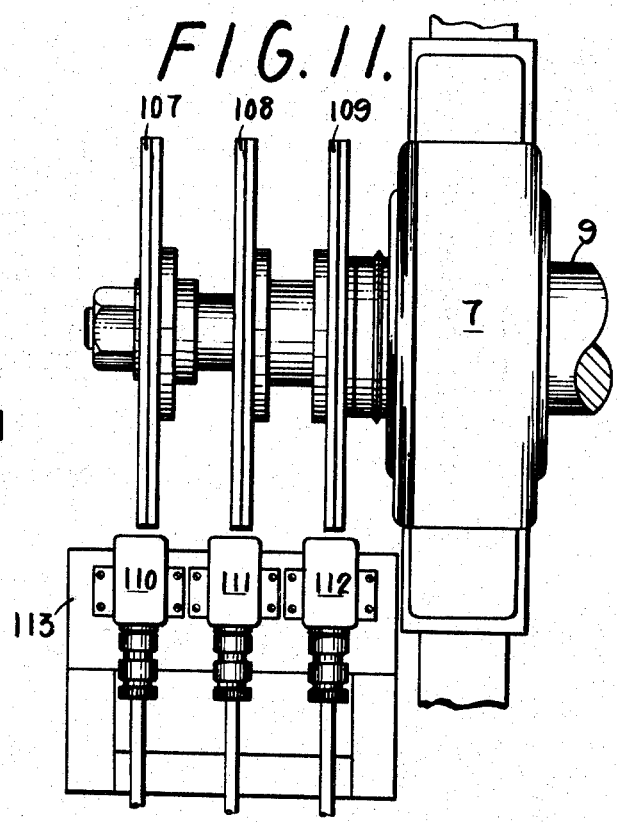
INVENTOR
*TAKAO WAKABAYASHI*
BY *Morley Kojima*
ATT'NY

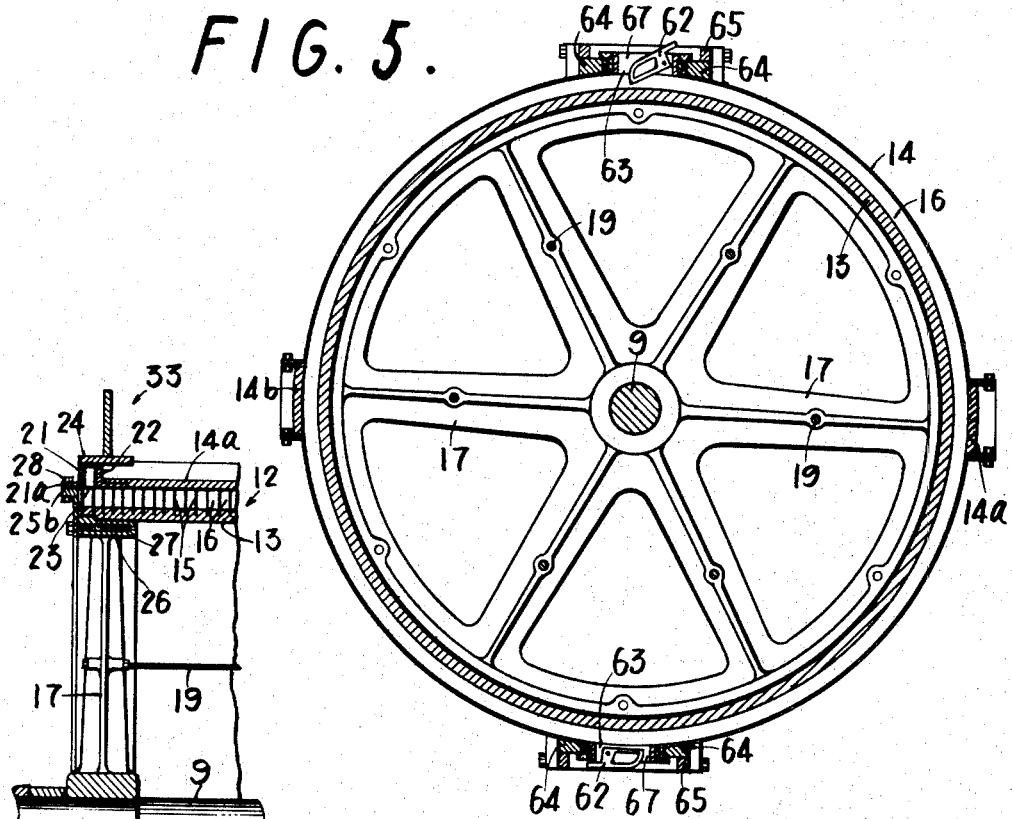
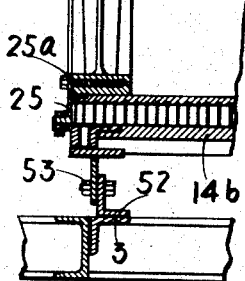
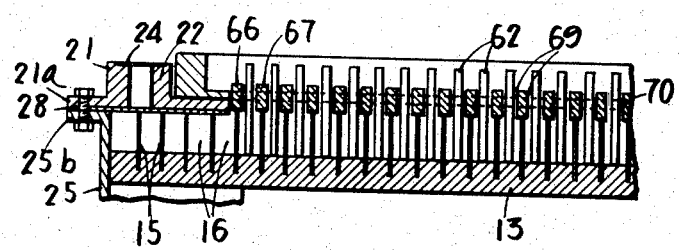

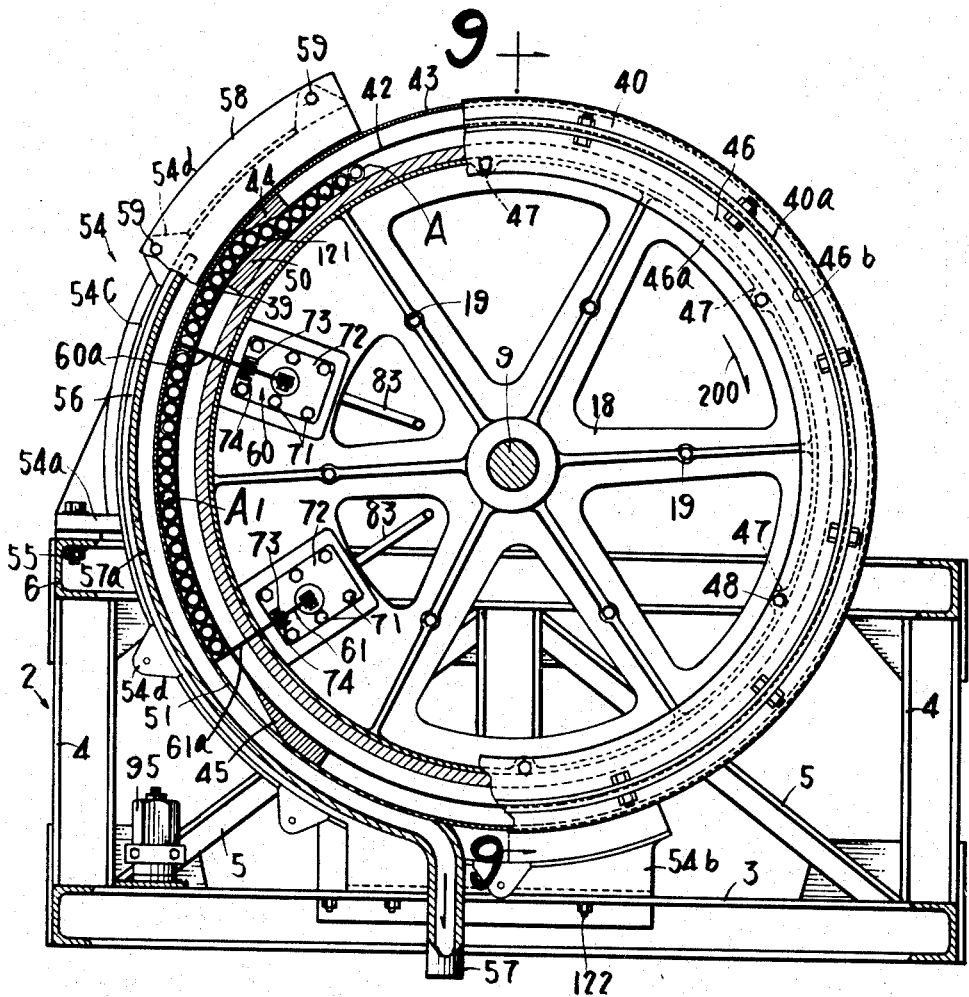

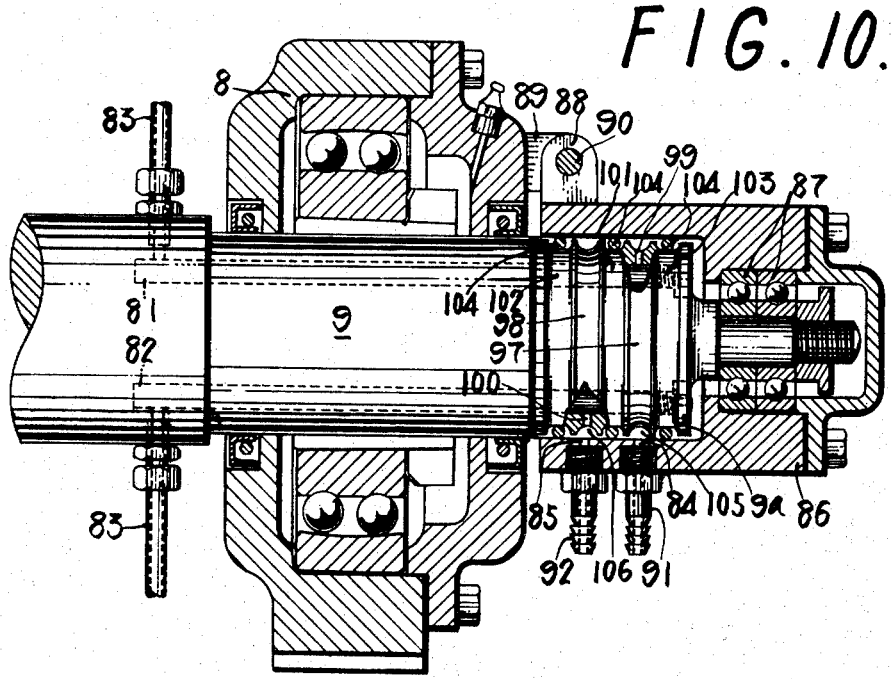
FIG. 10.
FIG. 16.
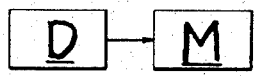
FIG. 17.
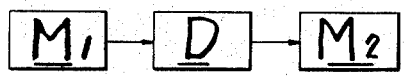
FIG. 18.
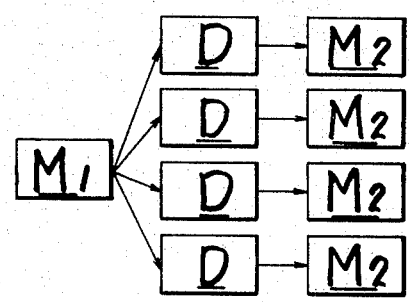
FIG. 19.
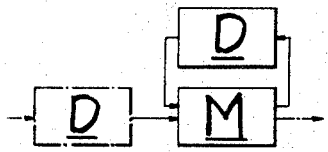
INVENTOR
TAKAO WAKABAYASHI
BY
ATTNY Dec. 10, 1968  TAKAO WAKABAYASHI  3,415,356
STORAGE AND FEEDING APPARATUS
Filed May 24, 1967  7 Sheets-Sheet 7

INVENTOR
TAKAO WAKABAYASHI
BY
ATTNY

United States Patent Office 3,415,356
Patented Dec. 10, 1968

3,415,356
STORAGE AND FEEDING APPARATUS
Takao Wakabayashi, Tarumi-ku, Japan, assignor to Nakanishi Metal Works Company, Ltd., Osaka, Japan, a joint-stock corporation of Japan
Substituted for abandoned application Ser. No. 410,627, Nov. 12, 1964. This application May 24, 1967, Ser. No. 656,612
Claims priority, application Japan, Jan. 31, 1964, 39/5,037
6 Claims. (Cl. 198—215)

ABSTRACT OF THE DISCLOSURE

Briefly, this invention encompasses a storage and feeding apparatus comprising a channel means having a front end and a rear end and having the form of a spiral and into which rear end items may be inserted, means for rotating the channel means about its spiral axis to cause the items to move in a forward direction, means for preventing the items from going in a reverse direction when said channel means is being rotated, and means for releasing the items in predetermined quantities from the front end of the channel means, which releasing means comprising gating means on the channel means responsive to predetermined rotational position of the channel means.

---

This is a substitute application for patent application Ser. No. 410,627, filed on Nov. 12, 1964, by the present inventor and entitled, "Storage and Feeding Apparatus," and now abandoned.

This invention relates to stroage apparatus for use in production lines and with automatic equipment and the like, and more particularly to a new type of storage and feeding apparatus.

In production lines and with machine tools, automatic equipment and the like it is necessary to have a ready supply of items for use therein. For example, in constructing a motor for an automobile it is necessary to have available different sized gears at different locations along the production line. Previously, the supply of items were piled up on shelves or on tracks which would take up a considerable amount of storage space. These prior art storage arrangements were complex, inefficient and left much to be desired when used in or with automated production lines.

Moreover, in automated production lines, it is necessary to feed predetermined quantities of items, such as gears, at predetermined times to predetermined locations. If a single error in the quantity or the timing occurred a "bottle neck" would result and the entire production line would be cumulatively delayed from station to station. Thus, production would be slowed and costs of production would increase.

An object of this invention is to reduce the foregoing deficiencies and difficulties of the prior art by providing a new type of storage and feeding apparatus for use in production lines, machine tools and the like.

A further object of this invention is to eliminate production line bottlenecks resulting from erroneous quantity and timing of supplies.

Further objects of this invention are to simplify storage and feeding apparatus, to reduce the size and space required for such apparatus, and to increase their utility.

These and other objects of this invention are attained in an illustrative embodiment thereof which briefly comprises a channel or storage chamber in the form of a spiral course whose axis is arranged horizontally and in which a series of items can be held, a motor for rotating the channel about its axis to cause the items to move by force of gravity in a forward direction, and a latch mechanism disposed in each loop of the spiral for preventing the items from moving in a reverse direction while the channel is being rotated.

With this invention, the items, such as a plurality of gears, can be inserted into the channel for storage and feeding to a production line at a proper time. When the channel is rotated, the series of items will roll forward by force of gravity and when they reach a point where the item will tend to fall in a reverse direction the latch mechanism will be inserted into the channel to prevent the items from reversing their direction of travel. Thus, the items will only travel in a forward direction until they reach the end of the spiral.

A release or discharge mechanism is provided at the end of the spiral channel which is controllable by the rotational position of the spiral channel to release predetermined quantities of the items and at predetermined times from the spiral channel.

In one specific embodiment of this invention, the spiral is helical and has its loops adjacent to each other and is formed between an inner drum and an outer drum by a helical strip and the two drums are driven concurrently by a motor. A feeding and removal mechanism is provided, each having a tube into which items can be fed and a loop of similar cross-sectional dimensions as the spiral but of a larger diameter which is connected to a respective end of the spiral. The mechanisms are arranged to feed into and remove from the channel the items both during rotation and idleness of the drums by providing a transfer loop between the tubes and the spiral ends. A cam arrangement driven by the motor and indicative of the rotational position of the spiral channel controls operation of a relay which in turn controls a cylinder and piston arrangement to cause a pivotal push rod to block or unblock the tube of the release mechanism and thereby release predetermined quantities of items at predetermined times. In this specific embodiment, compressed air can be used in the cylinder to cause operation of its piston, and hence, operation of the stoppers.

A feature of this invention is a helically or spirally shaped channel or storage chamber rotatable about its axis for holding a series of items and means for preventing the items from travelling in a reverse direction while the channel is rotating.

Another feature of this invention is an inner cylindrical drum and an outer cylindrical drum between which the channel is defined by a helical strip disposed therebetween and wherein the channel has its many loops adjacent each other.

Another feature of this invention is a feed mechanism and a release mechanism each comprising a tube and a curved channel of similar cross-sectional areas as the spiral channel and connectable to respective ends of the spiral at the same time.

A further feature of this invention is a latch mechanism for controlling the direction of travel by the items in the spiral, which travel normally by gravity, and comprising a bar which is movable out of the channel for forward movement of the items and movable into the channel to block the channel to prevent reverse movement of the items.

Another feature of this invention is a pair of stop bars for insertion into the channel to control the quantity and time the series of items are emitted from the spiral. It is an aspect of this feature of this invention that the stop bars are operable by a cylinder and piston which may be operated by compressed air when a cam which is in synchronism with the rotation of the spiral causes the operation of relays which in turn control the supply of compressed air to the cylinder.

This invention and its other objects, features and advantages will best be more readily understood from a consideration of the following detailed description taken in connection with the accompanying drawing, in which:

FIG. 3 is a sectional view taken along line 3—3 of FIG. 2; depicting in greater detail aspects of the channels and feeding mechanism of this invention;

FIG. 4 is a sectional view taken along line 4—4 of FIG. 1 depicting the discharge mechanism of this invention;

FIG. 5 is a sectional view taken along line 5—5 of FIG. 1 depicting a pair of check valves used to prevent reverse travel of items stored in the channel during its rotation;

FIG. 6 is an enlarged partial plan view of an illustrative embodiment of this invention depicting further details of the check valves;

FIG. 7 is a sectional view taken along line 7—7 of FIG. 6;

FIG. 8 is a sectional view taken along line 8—8 of FIG. 6;

Figure 1:
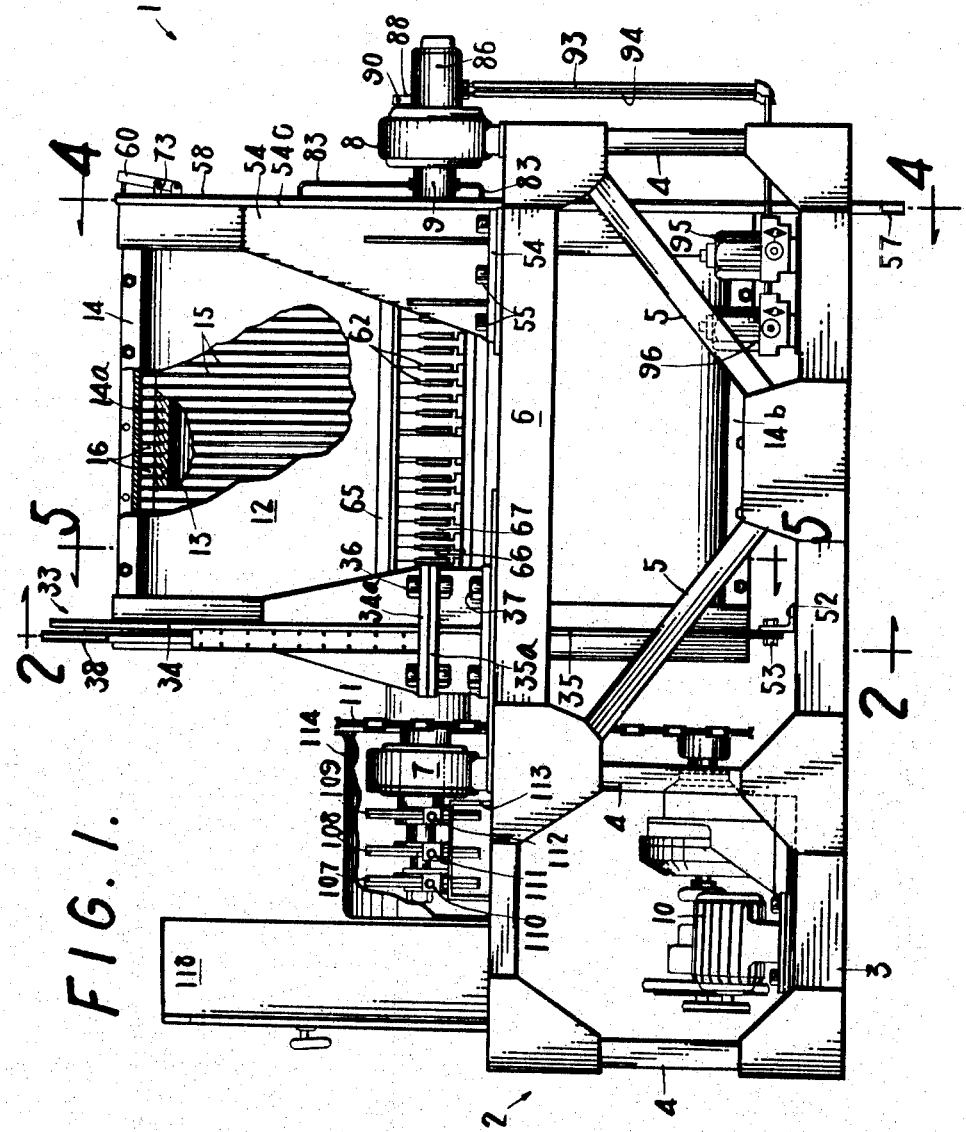
FIG. 1 is a fragmentary side elevational view depicting an illustrative embodiment of this invention.

FIG. 9 is a sectional view taken along line 9—9 of FIG. 4 depicting the discharging mechanism of this invention comprising a push-stopper and a receiving-stopper arranged in the final loop of the spiral channel; and a FIG. 10 is an enlarged side elevational view in section, compressed air feed apparatus therefor;
depicting the driving shaft of the illustrative embodiment of FIG. 1 and the compressed air feed apparatus used to operate the releasing mechanism depicted in FIG. 9;

FIG. 11 is an enlarged plan view depicting the disc cams and proximity switches of the illustrative embodiment of FIG. 1;

FIG. 12 through 15 are diagrammatic views of the disc cams and proximity switches of FIG. 11 and the releasing mechanism of FIG. 9 illustrating, step by step, the manner in which contents in a channel may be discharged;

FIG. 16 is a diagram depicting the use for an illustrative embodiment of this invention in an automatic feeder for a machine tool;

FIG. 17 is a diagram depicting another use for an illustrative embodiment of this invention as a buffer or a regulator between machine tools;

FIG. 18 is a diagram depicting a further use for an illustrative embodiment of this invention as a medium for making up efficiency differences between a plurality of machine tools; and FIG. 19 is a diagram depicting a yet further use for an illustrative embodiment of this invention as an automatic feeder for a machine tool that repeats a plurality of processes.

Referring now to the drawings, in FIG. 1 there is depicted a preferred illustrative embodiment of this invention comprising a storage and feeding system 1. The system is supported by a frame support structure 2 equipped with a base 3, numerous vertical columns 4, slanting columns 5 arranged at a distance from each other, and an upperside support frame 6 and constructed as depicted.

Supported by the support structure 2 is a drum 12 consisting of an inner cylinder 13 and of an outer cylinder 14 which includes a plurality of top connections 14a and a plurality of bottom connections 14b. (See also FIGS. 3 and 5.) The diameter of the inner cylinder is smaller than the diameter of the outer cylinder.

In the clearance between the two cylinders 13 and 14 a belt-shaped diaphragm or strip 15 extends spirally from one end of the cylinders to the other end. One edge of the diaphragm or strip 15 is embedded in and secured to the surface of the inner cylinder 13. A storage chamber or channel 16 is formed in a spiral course and defined by the inner cylinder 13, the outer cylinder 14 and the spiral diaphragm or strip 15. Of course, the spiral may be helical or merely curved.

A driving shaft 9, which is supported by bearings 7 and 8 provided respectively on the left and right end portions of the upperside support frame 6 is used to rotate the drum. The motive power to drive the shaft 9 is provided by a motor 10 attached to the base 3 through a sprocket chain and gear arrangement 11. The entire arrangement may be controlled by a control circuit contained in box 118.

Figure 2:
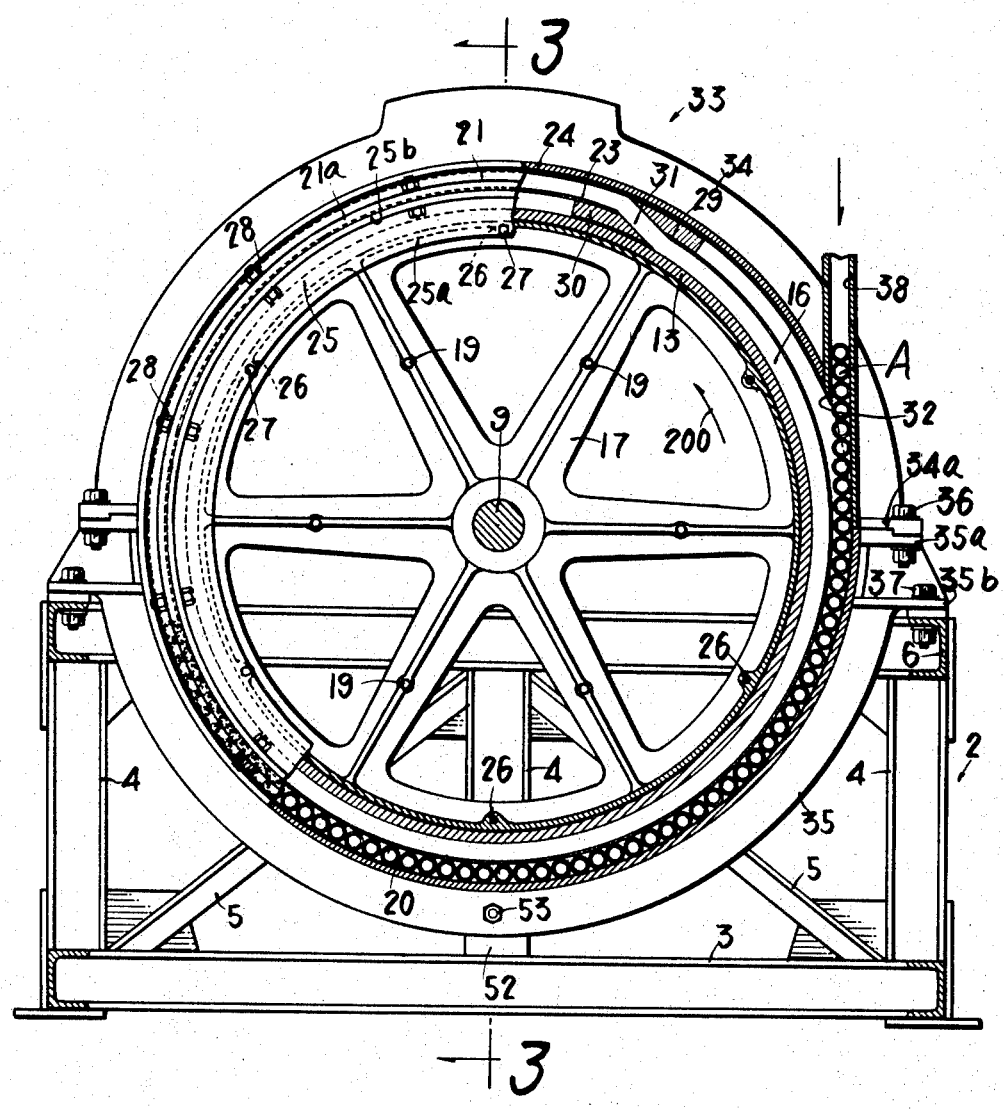
FIG. 2 is a sectional view taken along line 2—2 of FIG. 1; depicting the feeding mechanism of this invention.

Turning briefly to FIGS. 2, 3 and 4, the inner cylinder 13 is supported by a pair of circular end plates 17 (see FIG. 2) and 18 (see FIG. 4), which are in the shape of spokes and are attached, respectively, to the left and right ends of the drum 12 and are secured by bearings to the driving shaft 9 in the manner depicted. The end plates are connected to each other by numerous double-end nutted bolts 19 set in the spokes between the inner cylinder 13 and the driving shaft 9.

In FIGS. 2 and 3, there is depicted a feeding mechanism comprising a circular admission part 20 provided on the outer circumference of the left end of the drum 12. The admission part is circular in shape and has a larger radius than the spiral course channel 16. It comprises two L-section rings 21 and 22 disposed apart from and opposite to each other, and of a thin inner ring 23 and a thin outer ring 24 mounted respectively inside and outside thereof in the manner depicted. A cover plate 25 covers the left end (i.e. the first or beginning loop of the spiral) of the storage chamber or channel 16. It is secured to the end plate 17 by set-screws 27 being fastened through its inner brim 25a to numerous protrusions 26 formed at intervals on the periphery of the end plate 17. The flange 25b of the cover plate 25 and the flange 21a of one L-section ring 21 are connected to each other by numerous bolts and nuts 28.

The feeding mechanism or admission part 20 rotates concurrently with and as a part of the drum 12. The admission part 20 is arranged to fit the storage chamber 16 through a communication passage 31 formed by two sloping plugs 29 and 30 disposed opposite each other in the manner shown in FIG. 2. The admission part 20 is equipped with a supply inlet 32 formed through the outer ring 24. Around the circumference of the outer ring 24 is loosely fitted a drum frame 33 comprising an upper semicircular member 34 and a lower semicircular member 35 which are fastened together with a plurality of bolts and nuts 36 disposed through their upper flanges 34a and their lower flanges 35a. The drum frame 33 is secured to the upper support frame 6 with a plurality of bolts and nuts 37 disposed through a flange 35b on the lower semicircular member 35 in the manner depicted in FIG. 2. The lower semicircular member 35 is secured to an L-shaped metal fitting (52) on the lower frame (3) by a bolt and nut 53 as depicted in FIG. 3.

To one end (right end in FIG. 2) of the drum frame 33 is perpendicularly secured a square section supply pipe 38. This supply pipe 38 may be connected to a supply of items (not illustrated) which may feed a plurality of items, such as bearings, to the admission part 20 of the feeding mechanism when the port of the supply pipe 38 mates with the supply inlet 32. By rotating the drum 12 such as in the counterclockwise direction illustrated by arrow 200 in FIG. 2, the items A in the storage chamber 16 will be caused to roll down toward the bottom of the drum 12 by force of gravity. The motor 10 of FIG. 1 is used to rotate the drum. The contents of items A are fed in a clockwise direction through the admission part 20 through the communication passage 31 to the spiral diaphragm 15. The items A are moved gradually and in regular order through the spiral course storage chamber or channel 16 from the left end of the drum 12 to the right end thereof. It is to be understood that the speed of rotation of the drum 12 must be suitably regulated to prevent the contents or items A from being rotated in the same direction as the drum and from being centrifugally stuck to the outside cylinder 14. The speed of rotation of the drum should be such that the contents or items A will advance through the spiral channel 16 in a forward direction by force of gravity acting upon the items A and will not be adversely affected by the centrifugal force acting on the items due to the rotation of the drum. Of course, by reversing the pitch of the spiral, the items may be caused to move in the direction of rotation of the drum.

Turning now to FIGS. 4 and 9 there is depicted a discharge part 39 at the right end of the drum 12 made of two L-section rings 40 and 41 disposed apart from each other, a pair of thin rings 42 and 43 mounted on the inner and outer edges thereof, a pair of plugs 44 and 50 having suitable slopes and disposed apart from each other in the manner shown to form a channel therebetween and a third plug 45 for directing the items out of the discharge part. The discharge part is circularly shaped and of a larger radius than the spiral channel or storage chamber 16. A cover plate 46 is secured by set-screws 48 being disposed through its inner brim 46a to numerous protrusions 47 formed at intervals along the periphery of the side plate 18 to form a covering for the right end of the storage chamber 16. The flange 46b of the cover plate 46 is attached by numerous bolts and nuts 49 to the flange 40a of the ring 40 as depicted in FIG. 4. A discharge part 39, as in the case of the admission part 20 depicted in FIG. 2, rotates as a part of the drum 12 and may be connected to the storage chamber 16 through a communication passage 121 formed by the pair of plugs 44 and 50. The discharge mechanism or part 39 is equipped with a discharge outlet 51 formed through an opening in the ring 43 and extending to the plug 45.

On the left side of FIG. 4 there is depicted a slanting semicircular frame 54 secured by a plurality of bolts and nuts 55 disposed through the flange 54a formed in the middle thereof to the upper support frame 6. The frame 54 has an L-shaped fitting portion 54b at its lower end, which is secured by a plurality of bolts and nuts 122 to the lower frame 3 and a protruding brim 54c formed on its outer circumference. The frame 54 is disposed to form a groove 56 between its protruding brim 54c and the ring 43 and is used to hold cover plate 58 and a part of the discharge mechanism as will be discussed hereinafter in greater detail.

A square cross section discharge pipe 57 is secured to the lower part of the frame 54 and has a gutter like extension 57a extending into the groove 56 as shown in FIG. 4. For each revolution of the drum 12, the supply inlet 32 (of FIG. 2) at one end (left in this embodiment) of the storage chamber 16 is caused to engage with the supply pipe 38, and concurrently therewith the discharge outlet 51 (of FIG. 4) at the other end (right in this embodiment) of the storage chamber is caused to engage with the discharge pipe 57. The protruding flanges 54c of the drum frame 54 has a plurality of triangular fitting portions 54d to which the cover plate 58 may be secured with set-screws 59 to provide a cover for the discharge channel portions.

The discharge part 39 has a push-stopper 60 and a receiving-stopper 61 positioned at a suitable circumferential distance from each other as illustrated in FIG. 4. The push-stopper 60 and receiving-stopper 61 are utilized to control the quantity and time when the contents or items A are released through the discharge pipe 57. Further discussion of these stoppers will be delayed to later in order to first more fully discuss the operation of this invention.

In one embodiment, it was found that if the contents A are filled about seven-tenths of the circumference of one loop of the spiral channel 16 of the drum 12, they would tend to advance forward in a direction opposite from that which the drum 12 is rotating, but would also tend to move backward as they approached the highest point of the upper semicircumference of the drum 12 thereby reversing their direction of travel through the spiral course chamber 16. As can be seen, when the items reverse their direction of travel, continuity from one item to the next is interrupted in each loop of the spiral course and the chamber 16 would not become filled completely. To alleviate this tendency, one or more check valves are provided in each loop of the spiral (depicted in FIGS. 1 and 5 through 8).

Turning to FIGS. 5 through 8 there is depicted at the top and bottom of the depicted spiral channel a pair of check valves 62. In the outer cylinder 14 of the drum 12 a pair of long windows 63 are provided for each loop of the spiral. On both the left and right side of the windows 63 are base plates 64 which lie along the arc surface of the outside cylinder 14 and which are pressed and secured to the outer cylinder 14 by a squarely-set frame 65.

A first plate 66 (FIG. 6) and a second plate 67 (FIG. 6) are alternately arranged, in parallel to each other, between the two base plates 64 and are secured thereto with set-screws 68 at their reverse L-shaped ends 66a and 67a (as can be seen best in FIG. 6). The ends 66a and 67a are slightly broader in width than the central portion adjacent the windows 63. The first plate 66 also has a wing part 66b formed inside its end 66a. The wing part 66b of the first plate 66 is inlaid inside the ends 67a of the adjacent plates 67 to form a long port 69 for each loop or pitch of the spiral course of the storage chamber 16. In FIG. 8, the check valve 62 is movably fixed to a shaft 70 attached to one end of each long port 69. The shaft 70 is secured to the first and second plates 66 and 67. The check valve 62 is provided with a protruded tail 62a to hold it in the long port 69.

When the check valve 62 is moved to an upper half of the circumference, it moves down of its own weight from the window 63 into the storage chamber 16 to block passage of items therethrough. On the other hand, when the check valve 62 is at a lower half of the circumference, it moves down out of the storage chamber 16 to clear it for passage of items therethrough. Thus, as the drum 12 rotates, the items A travelling through the top half of the circumference of the loop will be prevented from reversing direction of travel by the check valve 62 blocking their path, and the items A travelling through the lower half of the circumference will not be impeded in their travel by the check valve which is outside the chamber. In this manner the items will flow in a continuous uninterrupted chain through the spiral chamber. When the push-stopper 60 and the receiving-stopper 61 of FIG. 4 are operated to block discharge of the items A from the storage chamber, items A can be fed continuously from the supply inlet 32 to the admission part 20 of the feeding mechanism and by rotating the drum 12, through action of the motor 10 in FIG. 1, in a direction depicted by arrow 200 in FIGS. 2 and 4, the contents A will advance by force of gravity along the spiral diaphragm 15 in an opposite direction and gradually be accumulated in the storage chamber 16, forming an orderly and spiral line along the spiral course of the chamber. When the storage chamber is filled, the rotation of the drum may be halted.

Once the chamber is filled sufficiently to fill the last loop of the spiral, the items can be discharged in predetermined quantities and at predetermined times by operation of the push stoppers 60 and 61. For a detailed description of these push stoppers, it is best to return to FIGS. 4 and 9.

In FIGS. 4 and 9, there is depicted a push-stopper 60 which includes a lever 60a and a circular keeper plate 60b which enters from a port 119 and which presses the contents or items A against a wall of discharge part 39.

The keeper plate 60v and attached rod, can of course, be sufficiently long to completely block the discharge part 39 without having to press the contents A against the wall. The receiving-stopper 61 includes a lever 61a and a slender receiving-stop bar 61b which enters from a port 120 to prevent the items A from falling and discharging from the discharge part 39. The push stopper 60 and receiving-stopper 61 are each movably fastened by a pin 74 to a pillar 73 provided on a support plate 72 which is secured to an end plate 18 with numerous bolts and nuts 71 (not shown in FIG. 9). The stoppers may be free to vibrate. To the back side of each support plate 72 and through the side plate 18 is attached an air cylinder 75 and 76 for the stoppers 60 and 61, respectively. The corresponding pistons 77 are attached to rods 78 which pass through the support plates 72 are fixed loosely to the distal ends of the respective levers 60a and 61a by means of a pin 79. In each of the cylinders 75, 76 there is provided a compression spring 80 which pushes the pistons 77 to the right in an unactuated position. When air is applied to the cylinders, the respective piston 77 will be moved to the left against force of the spring 80. Air may be supplied to the cylinders by an arrangement which is depicted in greater detail in FIG. 10.

In FIG. 10, two air admission passages 81 and 82 are formed inside the driving shaft 9 and are connected to the air cylinders 75 and 76 (of FIG. 9) through a pair of pipes 83. On the distal end 9a of the driving shaft 9 there is mounted on ball-bearings 87 a cap 86 having two parallelly placed air inlets 84 and 85. A lug 88 extending perpendicularly from the upper part of the left end of the cap 86 is held by a pin 90 to a lug 89 extending horizontally from the upper part of the right end of a bearing 8 which is fixed to the upper support frame 6 (as seen in FIG. 9). Consequently, the cap 86 is securely connected to the bearing 8 and is independent of the driving shaft 9. Pipe joints 91 and 92 leading to the air inlets 84 and 85 are screwed into the cap 86.

Air is supplied to these inlets through pipes 93 and 94 depicted in FIG. 1. The pipes 93 and 94, as depicted in FIG. 1, are supplied from an air tank through a first solenoid 95 and a second solenoid 96 provided on the base 6 of the frame support structure 2. The first solenoid 95 is used for controlling the air supplied to the push-stopper cylinder 60, and the second solenoid 96 is used for controlling the air supplied to the receiving-stopper cylinder 61.

Two semicircular section grooves 97 and 98 of FIG. 10 are provided on the circumference of the right end 9a of the driving shaft 9 and face the air inlets 84 and 85. A pair of openings 99 and 100 formed in the respective grooves 97 and 98 communicate with the respective air admission passages 81 and 82. The pair of grooves 97 and 98 are surrounded by U-section grooves 101, 102 and 103 held in place by three ring packings 104. Thus the groove 97 is completely separated from the groove 98. Annular air chambers 105 and 106 are formed between the inner surface of the cap 86 and the respective grooves 97 and 98 as depicted. Hence, compressed air from an air tank (not shown) may flow through the respective air inlets 84 and 85, through the respective annular air chambers 105 and 106, through the respective communicating passages 99 and 100 to the respective air inlet 81 and 82 within the driving shaft 9. In this manner air may be supplied to the cylinders while the driving shaft 9, pipes 83 and air cylinders 75 and 76 are rotating integrally with the drum 12.

The push-stopper 60 and receiving-stopper 61 are operated by the respective air cylinders 75 and 76 which are actuated by air travelling through pipes 93 and 94 of FIG. 1. The air supply is controlled by opening and closing solenoids 95 and 96. The pair of solenoids 95 and 96 are opened and closed by proximity switches 110, 111 and 112 which are actuated by three disc cams 107, 108 and 109 attached to the left end of the driving shaft 9 as depicted in FIGS. 1 and 11. The proximity switches 110, 111 and 112 are of a known type which operate when a cam approaches their sensors and are fixed parallely on a base 113 formed on the upper support frame 6. The sensors of the proximity switches are respectively positioned opposite the disc cams 107, 108 and 109. The switches, cams and a bearing 7 are placed in a housing 114 as depicted in FIG. 1.

The action of the cams 107, 108 and 109 upon the push-stopper 60 and receiving-stopper 61 will be more apparent with reference to FIGS. 9 and 12 through 15. The opening and closing of the receiving-stopper 61 is controlled by two cams 107 and 108 and the opening and closing of the push-stopped 60 is controlled by one cam 109. The cams 107 and 108 (FIGS. 12 through 15) are respectively equipped with short protrusions 115 and 116 respectively extending in a circumferential direction. When the protrusion 115 of cam 107 approaches the proximity switch 110 (e.g. in FIG. 15), an electrical signal is produced which causes the solenoid 96 to open and permit air from a tank to be supplied to the air cylinder 76 of FIG. 9. The air causes the associated piston 77 to move to the left against the compression spring 80 and to open the receiving-stopper 61.

When the protrusion 116 of the cam 108 is near the proximity switch 111 it causes the proximity switch 111 to generate a signal which causes the solenoid 96 to close thereby cutting off the air supply to the air cylinder 76 and releasing air therefrom. Consequently, the compression spring 80 recoils and closes the receiving-stopper 61.

The time of and period during which the receiving-stopper 61 is opened and/or closed may be easily regulated by changing the position of the protrusions 115 and 116 of cams 107 and 108 respectively, relative to the proximity switches 110 and 111. The protrusions 115 and 116 of the cams of the cams 107 and 108 respectively are, as described, short in a circumferential direction, and hence the signal pulses caused to be generated thereby are very short. However, the signals caused by the protrusions are designed to be retained by self-operative holding relays (not shown).

Figure 12:
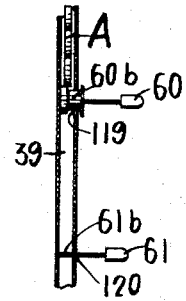
Figure 13:
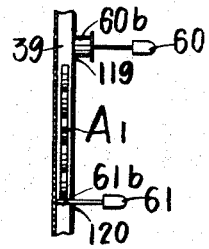
Figure 14:
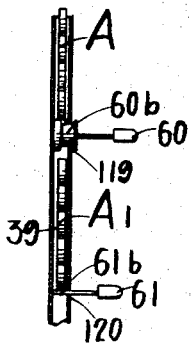

The cam 109 has a long protrusion 117 in a circumferential direction, as depicted, for example, in FIG. 12. While the protrusion 117 is near the proximity switch 112, an electrical signal is caused to be generated by the switch which is transmitted to the solenoid 95 to cause its opening. Air is thus caused to flow through pipe 93 to actuate the air cylinder 75 and thereby open the push-stopper 60. When the cam 109 moves to cause the protrusion 117 to depart from vicinity of the proximity switch 112 (e.g. in FIG. 15) the solenoid 95 is closed and the push-stopper 60 is closed. The protrusion 117 of the cam 109 is, as described above, long in a circumferential direction and its holding time of signal pulse is long.

When the contents or items A are desired to be discharged in a fixed quantity at a fixed time, the push-stopper 60 is first closed and one or more items A are pressed against the discharge part wall 39 by keeper plate 60b acting through port 119. Thereafter the receiving-stopper 61 is closed (see FIG. 12) by having rod 61b acting through port 120. Next, the push-stopper 60 is opened and the contents A1 are passed through the channel 39 and are stopped by receiving-stopper 61b. (See FIG. 13). When a fixed quantity of items A1 are gathered between the receiving-stopper 61 and the push-stopper 60, the push-stopper 60 is again closed (see FIG. 14). In this case the quantity of items A1 is, of course, determined by the distance between the receiving-stopper 61 and the push-stopper 60. It is difficult to equip the final loop or pitch of the spiral course of the storage chamber 16 with a check valve 62. Therefore, in the last course of the storage chamber 16 the contents A may move backward but a fixed quantity of contents A1 will be retained between the receiving-stopper 61 and the push-stopper 60. This retained quantity of items is discharged from the discharge outlet 51 outside the drum 12 through the discharge pipe 57 by opening the receiving-stopper 61. The discharged items A1 may be used, for example, by one or more machine tools as will be described hereafter.

Figure 15:
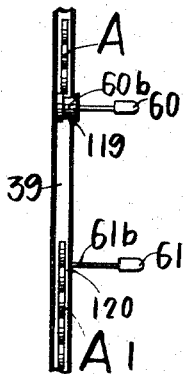

In the above example, the push-stopper 60 in FIG. 15 presses the next sequence of item or items against the wall of channel 39 to prevent the contents A arriving after the fixed quantity of contents A1 from being discharged. Then the receiving-stopper 61 is again closed, and the cycle may be repeated to discharge intermittently predetermined quantity of items from the drum 12 at predetermined times. If both the push-stopper 60 and the receiving-stopper 61 are opened, the contents A of the drum 12 are discharged in regular sequence. The operation of this invention operation may be controlled by appropriate control means 118 provided on the left side of the upper support frame 6.

Although not illustrated, this invention may have two or more storage chambers 16 in the form of more than two or more concentric or non-concentric spiral courses, and a correspondingly increased number of auxiliary equipment.

FIG. 16 depicts in block diagram form one illustrative use of this invention as an automatic feeder for a machine tool M. The contents of the drum D may be discharged in any required quantity and fed to the machine tool M. The machine tool M of this and the following examples of FIGS. 17, 18 and 19 may be any appropriate machine, production line or automatic equipment and the like.

FIG. 17 illustrates another typical use of this invention as a buffer or a regulator between a pair of machine tools M1 and M2. This invention in this use may enable accurate regulation of the difference in the operational cycles of the two machine tools M1 and M2 in sending work from one M1 to the other machine M2. For example, in manufacturing ball-bearing races, a ball-truck grinding machine M2 is necessary for the machine tool M1 or a finishing machine M2 is needed for the machine tool M1 and this invention may act as a buffer between the two to marry successfully the different operational cycles.

FIG. 18 shows a plurality of drums D of this invention used for making up efficiency differences of machine tool M1 and a plurality of machine tools M2. Often in tool making, one or more machine tool M1 are arranged to supply an equal number of machine tools M2 with the kind of work fed to the one set of machine tool M1 being different from that fed to the other set of machine tools M2. However, because differences of efficiencies may exist between the different machine tools M1 and M2, there may be a tendency to decrease the total efficiency. By placing a drum D of this invention between the two sets of machines, only one machine tool M1 will suffice to supply more than two machine tools M2. This invention enables the determination of the most efficient lots for one machine tool (e.g. M1) and to feed the devices D with work in accordance with the most efficient schedule. The work thus supplied is fed to the plurality of machine tools M2 in regular and continuous sequence in accordance with the best efficiencies of the plurality of machine tools M2. For example, in the manufacture of bearing races, a centerless grinding machine is necessary as machine tool M1 and a ball-truck grinding machine is needed as machine tool M2. In this case the drums D of this invention may be used to act as a channel or buffer between the two and match the efficiencies of the two machine tools.

FIG. 19 shows a pair of drums D used as an automatic feeder for a machine tool M that repeats a plurality of processes. By mating a storage drum D with the machine tool M, work may be repeatedly supplied in cycles flowing to and from the machine tool M as indicated by the arrows. For example, in the manufacture of bearing races, a centerless grinding machine or a double disc surface grinding machine is necessary as a machine tool M and a drum D may be used as a channel between either machine and the machine tool M to store items and feed the items at appropriate times for the repeated cycles.

It is to be understood that the specific embodiments herein described are merely illustrative of the principles of the invention, and that various modifications may be devised by one skilled in the art without departing from the spirit and scope of the invention.

What is claimed is:

1. A storage apparatus comprising
 a channel means having a front end and a rear end and having the form of a spiral and into which said rear end items can be inserted,
 means for rotating said channel means about its spiral axis to cause said items to move in a forward direction,
 means for preventing said items from going in a reverse direction while said channel means is being rotated and
 means for releasing said items in predetermined quantities from said front end of said channel means, said releasing means comprising gating means on said channel means responsive to predetermined rotational position of said channel means.

2. The invention defined in claim 1 wherein said means for preventing reverse travel of said items comprises
 a lever in each spiral loop of said channel means, said lever being depressed for forward motion of said items and being rigid to obstruct said channel means for said reverse travel of said items.

3. The invention defined in claim 2 wherein further comprising means for feeding said items into said channel means, and wherein said means for releasing comprises
 control means rotatable in synchronism with said channel means,
 contact means responsive to said control means,
 a lever which is operable by a cylinder and piston arrangement, and
 means under the control of said contact means for operating said piston and cylinder arrangement when said channel means is at particular rotational positions to cause movement of said lever, and wherein said means for feeding and said means for releasing both are attached to said channel means at said rear end and said front end, respectively, at least once per revolution of said channel means.

4. The invention according to claim 3, wherein said cylinder and piston arrangement is operable by compressed air, and means for feeding compressed air to said cylinder and piston during rotation of said channel means.

5. A storage apparatus comprising
 a drum having an inner cylinder and an outer cylinder and means for rigidly positioning said cylinders with respect to each other and thereby have a fixed clearance therebetween,
 means for supporting said drum horizontally so as to be rotatable,
 means for rotating said drum,
 a storage chamber defined in the shape of a spiral by a strip rigidly fixed to said inner and outer cylinders and disposed within said clearance and extending from one end of said drum to another end thereof,
 a supply inlet arranged on said one end of said storage chamber,
 a discharge outlet arranged on said other end of said storage chamber,
 a check valve means disposed within each loop of said spiral of said storage chamber,
 discharge means comprising a push stopper, and a receiving stopper both disposed on said other end of said storage chamber between said discharge outlet and said storage chamber, and
 means for coordinating said rotating means and said discharge means whereby said discharge means is operative at certain rotative positions of said drum.

6. The intention defined in claim 5, wherein said discharge means further comprises a pair of air cylinders for respectively operating each of said push stopper and said receiving stopper, and wherein said coordinating means comprises disc cams rotatable concurrently with said drum, switches responsive to said disc cams, and a pair of solenoids under the control of said switches for causing compressed air to be applied to said pair of cylinders.

References Cited

UNITED STATES PATENTS

| 1,132,775 | 3/1915 | Hille | 198—213 |
| 1,330,219 | 2/1920 | Rockwell | 198—215 X |

STANLEY H. TOLLBERG, *Primary Examiner.*

U.S. Cl. X.R.

221—186